Dec. 30, 1930.  F. W. STEINMEYER  1,786,787

WINDOW DRAPE ILLUMINATOR

Filed March 5, 1929

INVENTOR.
FRED W. STEINMEYER
BY
George F. Ballay
ATTORNEY

Patented Dec. 30, 1930

1,786,787

UNITED STATES PATENT OFFICE

FRED W. STEINMEYER, OF OAKLAND, CALIFORNIA

WINDOW-DRAPE ILLUMINATOR

Application filed March 5, 1929. Serial No. 344,390.

This invention relates to a new and improved method of illuminating the interior of homes and especially relates to a new and improved device whereby the various rooms may be illuminated from the windows.

In the usual method of illuminating homes, floor lamps and other types of illuminating devices are used, all of which have certain disadvantages. Floor lamps, for example, are often in the way, particularly when a large number of people are assembled in a room, or a dance is given, and also are very easily knocked over and damaged. Other methods of lighting, such as chandeliers and different types of wall lamps, do not give the desired illumination, especially in expensive and high class homes where artistic window draperies are used.

It is therefore an object of the invention to improve the present method of illuminating the interior of homes by providing a new and improved device that is especially constructed to be mounted on the top of the window casing and extend over the window drapes, the said device being provided with artificial illumination means in such a manner that will illuminate the window draperies, and also artificially light the room from the window and through the draperies and device that is mounted thereon.

The specific objects of the invention are first, to provide an oblong box-like frame that is especially constructed to fit across the top portion of a window; second, to provide means for fastening the frame, detachable, in position across the top of the window; third, to provide transparent means on and around the frame that is constructed to downwardly extend over the window draperies; fourth, to provide means in the frame for holding the window draperies; fifth, to provide means in the frame for holding the window curtains; sixth, to provide means in the frame, and in the rear of the drapes, for producing artificial light; seventh, to provide means in the frame for reflecting said light; eighth, to provide means across the frame for diffusing the light; ninth, to provide a top and hinge same to the frame; tenth, to provide means in the frame for holding the window shade.

The invention possesses other objects and features of advantage, some of which, with the foregoing, will be made manifest in the following description of the preferred form of the invention that is illustrated in the drawings accompanying and forming part of the specification.

It is to be understood that it is not intended to limit the invention to the exact embodiment as shown by said drawings and description, as variations may be adapted within the scope of the invention as set forth in the claims.

Figure 1:
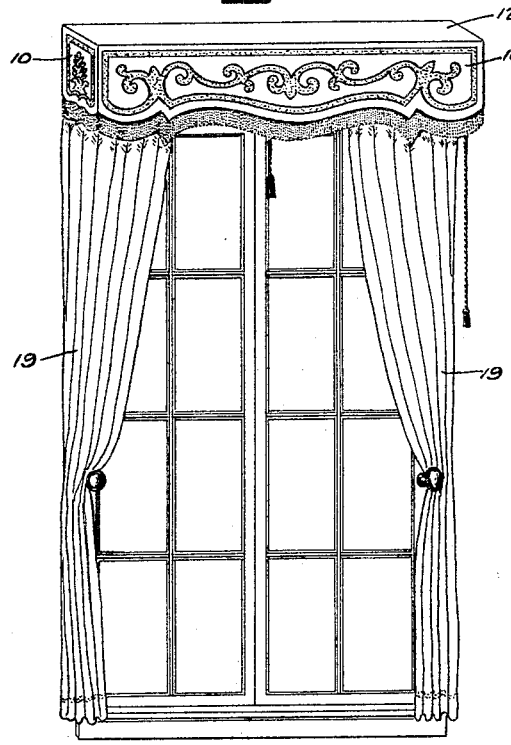
Figure 1 is an outer perspective view of one form of the invention mounted in position across the top of a window.

Referring in detail to the different parts wherein like reference characters denote corresponding parts throughout the several views; the numeral 6 designates the main frame, that is preferably made of wire, and is especially constructed to fit across a window frame as shown in Figure 1. The ends and front side of the frame is covered with a suitable semi-transparent material 10, upon which there is provided some form of artistic design as illustrated. The top 12, may be covered with any suitable material, and is preferably hinged to the front side of the frame to make it convenient to clean or replace the different parts within the frame, and also, to provide a cover that can be adjusted to different positions, to provide adjustable means to produce indirect lighting when desired. It is to be understood that the entire top or any portion thereof may be hinged to the frame and that the said top may be made out of bright tin or transparent material or any suitable type of artificial light-reflecting material that will reflect the light rays from within the device against the wall.

Figure 4:
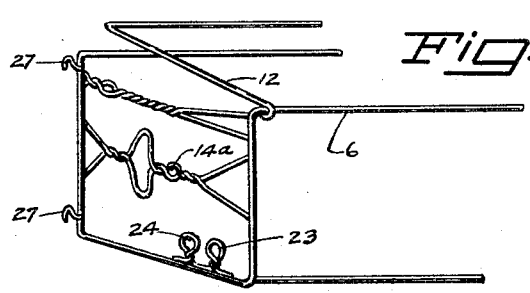
Figure 4 is a perspective view of a preferred type of frame used in the invention.

Any suitable number of lights may be used to illuminate the device, the present illustration showing a plurality of electric lights 14 that are arranged within the frame and substantially supported therein. The frame is preferably provided in the ends thereof with a plurality of loops that are formed as illustrated in Figure 4 to support the lights that are mounted in the ends of the frame. A reflector 15 is provided in the rear of the lights and is preferably fastened detachable to the frame and is provided with a socket 16 for holding a center light when it is desired to provide lights between the ends. A diffusing glass 18 is mounted in the frame and arranged in front of the lights 14 to diffuse the light across the entire front of the device. The combination of the reflector 15 and the diffusing glass 18, with the lights arranged therebetween, serves to produce uniform illumination.

Figure 2:
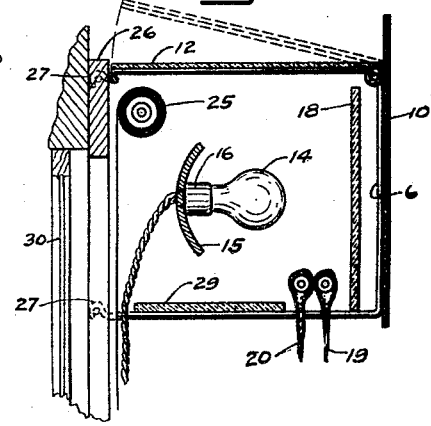
Figure 2 is a transverse sectional view of one type of device involving the invention.
Figure 3:
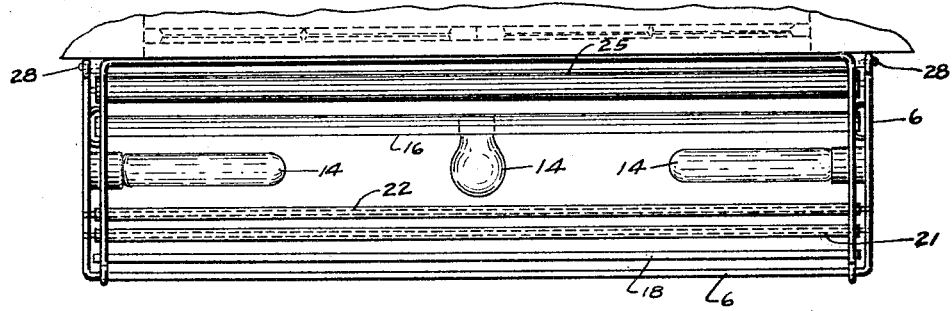
Figure 3 is a plan view of the invention, with the top removed.

The drapes 19 and curtains 20 are preferably held in position by being fastened on the rods 21 and 22 that are substantially held to the frame 6 by being mounted into the loops 23 and 24 respectively. The window shade 25 is arranged within the frame and may be fastened to either the frame or the window casing 26, the said frame being constructed to permit the shade to be raised or lowered without interfering with any of the parts involved in the device. A plurality of hooks 27 are provided on the frame 6 and are constructed to hook into a plurality of eyelets 28, that are fastened on the window structure and preferably fastened to the window casing 26, to substantially hold the frame 6, detachable, in front of the window. The bottom portion of the frame 6 may be left open if desired, but is preferably provided with a flat transparent member 29 as shown in Figure 2. This transparent member may be provided with different transparent colors to cause different colors of light rays to be reflected in front of the window 30 and against the draperies.

Having thus illustrated a certain form of construction and arrangement of parts pertaining to the invention, it is to be understood that the improvements may be embodied in any type device of the character described, which, obviously, may be built up in any suitable manner, the present illustration not being utilized as indicating the exact and only form of construction into which the parts may be made; and it is desired to include in this application for Letters Patent of the United States of America any and all patentable novelty that exists in the invention disclosed and all that comes within the range of the invention as set forth in the claims hereinafter mentioned.

What is claimed is:

1. An illuminating device of the character described, for use in combination with a window; said device comprising an oblong box-like frame mounted across the upper portion of the window; transparent material provided on said frame; window draperies provided between the front face of the frame and the window and adapted to extend downwardly therefrom; artificial illumination means provided between the front of the frame and the window and adapted to reflect light rays from the rear of the draperies through said draperies and transparent material on said frame; and means for fastening the device in front of the window.

2. An illuminating device of the character described, for use in combination with a window; said device comprising an oblong box-like frame mounted across the upper portion of the window; transparent material provided on said frame; window draperies provided between the front face of the frame and the window and adapted to extend downwardly therefrom; artificial light illumination means provided within the frame; a transparent member, adapted to be provided with different transparent colors, mounted across the bottom of the frame; said artificial light means being arranged in a manner that will reflect the light rays therefrom through said transparent member on the bottom of the frame and through said draperies; and means for fastening the frame, detachably, to the window structure.

3. An illuminating device of the character described, for use in combination with a window; said device comprising an oblong box-like frame mounted across the upper portion of the window; transparent material provided on said frame; window draperies provided between the front face of the frame and the window and adapted to extend downwardly therefrom; artificial light illumination means provided within the frame; a hinged top provided on the frame and adapted to be opened so that indirect light rays may be reflected above the frame; said artificial light means being arranged in a manner that will cause light rays therefrom to be reflected from the rear of the draperies through said draperies and transparent material on said frame; and means for fastening the frame, detachably, to the window structure.

4. An illuminating device of the character described, for use in combination with a window and window draperies; said device having in combination, an oblong box-like frame constructed to be mounted across the upper portion of a window; transparent material provided on said frame; means within the frame for holding the window draperies; a plurality of electric lights mounted in the frame to illuminate the draperies; means for diffusing the light rays provided longitudinally across the frame and arranged therein between said lights and the front face of the frame; a reflector provided in the rear of said lights and arranged longitudinally across the frame; means for causing indirect lighting to be reflected above the frame; and means for fastening the frame, detachably, to the window structure.

In testimony whereof, I hereunto affix my signature.

FRED W. STEINMEYER.